Nov. 15, 1932.    C. R. BUCHET    1,887,540
SEALING MEANS FOR SUBMERSIBLE MOTORS
Filed Jan. 12, 1931    2 Sheets-Sheet 1
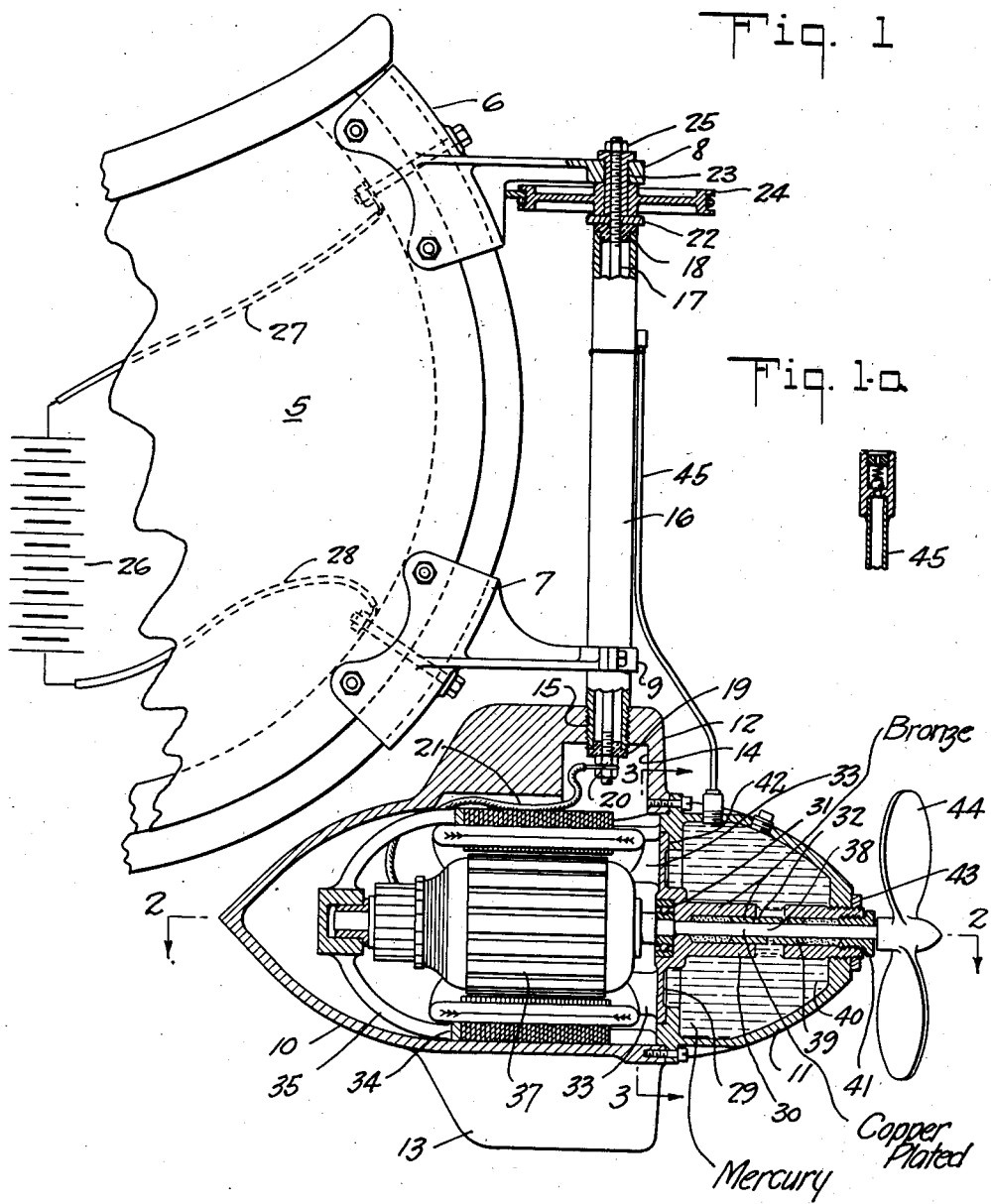
INVENTOR.
Conrad R. Buchet
BY Westall and Wallace
ATTORNEYS.

Nov. 15, 1932. C. R. BUCHET 1,887,540
SEALING MEANS FOR SUBMERSIBLE MOTORS
Filed Jan. 12, 1931   2 Sheets-Sheet 2
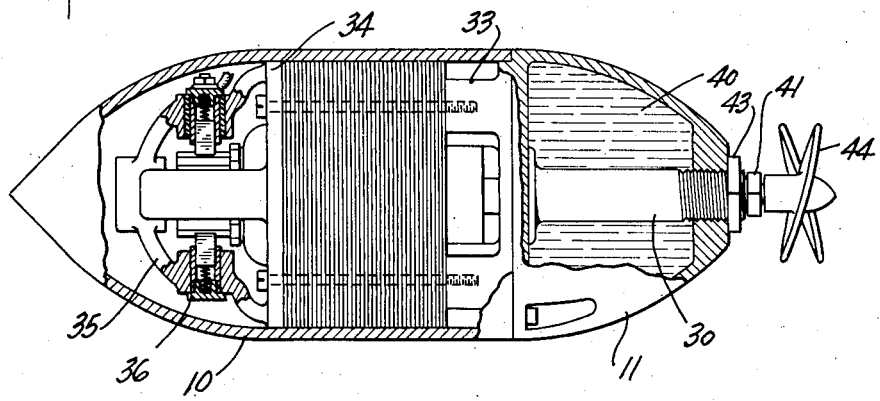
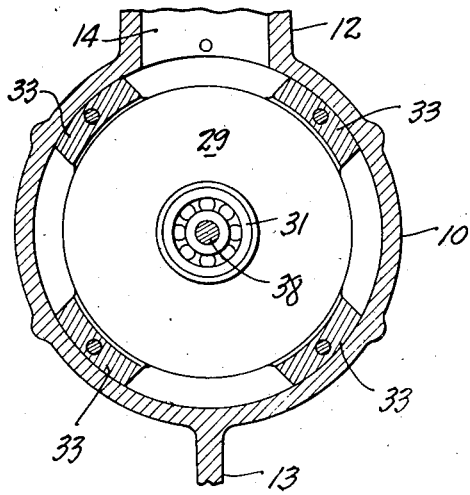
INVENTOR.
Conrad R. Buchet
BY Westall and Wallace
ATTORNEYS.

Patented Nov. 15, 1932

1,887,540

UNITED STATES PATENT OFFICE

CONRAD ROBERT BUCHET, OF LONG BEACH, CALIFORNIA, ASSIGNOR TO ADJUSTO EQUIPMENT COMPANY, OF LOS ANGELES, CALIFORNIA, A CORPORATION OF CALIFORNIA

SEALING MEANS FOR SUBMERSIBLE MOTORS

Application filed January 12, 1931. Serial No. 503,299.

This invention relates to a self-contained motor and propeller unit, such as may be detachably mounted outboard of a boat. It contemplates a water tight housing for the motor and a propeller mounted thereon capable of being driven direct by the motor. The unit has an upright column by which it may be attached to a boat in a manner such that column may serve as a tiller post to turn the unit for steering purposes.

The objects of this invention are first, to provide a motor and propeller unit with features of construction such that it may be submerged without danger to the operating parts; second, to provide an assemblage of parts which is simple, easily assembled and disassembled for servicing, repair and replacement of parts, and providing for shielded electrical connections to the motor; and third, to provide novel sealing means for shielding the motor.

These objects are obtained by means of the embodiment of my invention illustrated in the accompanying drawings, in which:—

Fig. 1 is a side elevation of a fragment of a canoe, with my improved unit mounted thereon and shown in vertical section; Fig. 2 is a section as seen on the line 2—2 of Fig. 1, parts being shown in elevation; and Fig. 3 is a section as seen on the line 3—3 of Fig. 1. Fig. 1a is a side elevation in section of a detail hereinafter referred to.

Referring with more particularity to the drawings, 5 indicates a canoe to which are attached brackets 6 and 7. Bracket 6 has a bearing at its outer end marked 8, and bracket 7 has a split bearing marked 9 placed in line with bearing 8. The bracket serves for pivotally mounting a column which carries a housing at the lower end.

The housing comprises a fore section 10 and an aft section 11, which assembled form a torpedo like housing. The fore section has an enlargement 12 at its upper side and a keel fin 13 at its lower side. The enlargement is formed with a chamber 14. The aft rim of the fore section is provided with tapped bolt holes. A threaded opening 15 leads to the chamber 14 and is adapted to receive a tubular column member 16. Extending through the tubular member 16 is a rod 17 of conducting material and it is insulated from the member 16 by plugs 18 and 19 of suitable insulation material. A nut 20 is secured to the lower end of rod 17 so as to maintain the rod in position and provide for connection thereto of a lead 21 which is connected to one terminal of the electric motor. Mounted upon the top of plug 18 is a washer 22, and mounted upon the washer is a sleeve bushing 23 to which is secured in any suitable manner as by a press fit a sheave wheel 24. A clamp nut and washer indicated generally by 25 is mounted upon rod 17 and abut the bushing 23. The construction is such that when the nuts 25 and 20 are set up tight, the column assemblage may be turned through the sheave wheel, by means of a tiller rope, not shown. The column member 16 and the rod 17 are electrically insulated from one another by the insulation plugs 18 and 19. A source of electrical energy such as a battery of cells illustrated diagrammatically at 26 may be connected on one side through a conductor 27 to the bracket 6 and on the other side through a conductor 28 to a bracket 7. Thus, through the intermediate connection, lead 21 of the motor is connected to one side of the battery and the other side of the battery is grounded to the housing.

The electric motor comprises a split frame having a lateral plate 29 which serves as a closure plate between the fore and aft chambers. Outstanding from the plate 29 is a tubular bearing 30 which is externally threaded at its outer end and has its bore provided with an internal thread. At the inner end of the bearing is a suitable type of roller bearing 31. Lubricant openings 32 are provided in the bearing member 30 to communicate with the bore. The plate 29 comprising a lateral section of the motor frame has legs 33 to which is secured by bolts the pole or stator frame 34. The stator frame carries a bearing bracket 35 supporting a brush mounting 36. The armature or rotor of the motor marked 37 has a shaft 38 supported in the bearing of bracket 36 and in the tubular bearing 30. Shaft 38 may be steel copper plated or may be bronze. The outer end of the bore in bearing 30 is enlarged in diameter to receive packing, there being a perforated bronze sleeve 39 so that the sealing fluid 40 may have access through openings 32 and through the perforations in sleeve 39 to the shaft. A gland nut 41 is mounted in the outer end of the bearing 30. The sealing fluid is mercury.

The aft section 11 of the housing has a ledge 42 against which the plate 29 of the motor frame rests and is arranged to form a leak tight fit therewith. The aft section 11 has bolt openings to register with the bolt openings in the fore section and bolts are provided for securing the fore and aft sections together. A nut 43 is mounted upon the bearing 30 to engage a flat rear end of the aft section and clamp the motor against the aft section. A propeller 44 is mounted upon the motor shaft 38. The fore section provides a housing for the motor and the aft section a sealing fluid holding chamber, it being filled with mercury 40. The motor is assembled on the aft section, the lead 21 connected to the rod 17 and then the aft section and motor assembled. Any water which gains ingress on the shaft will pass through the perforations in sleeve 39 to the sealing fluid chamber. A riser tube 44 parallels the column 16 and communicates with the sealing chamber. Any water leaking into the sealing chamber would rise in tube 44 and could pass out the top. If desired a check valve permitting egress of water may be provided at the top. However, due to the density of mercury the reaction pressure against water entering sealing chamber would be sufficient to prevent entrance of the latter. The mercury amalgamates with the bronze or copper and forms a leak tight fit between the shaft 38 and bushing 39.

What I claim is—

1. A submersible propeller and motor unit for boats comprising a housing, a plate dividing said housing to form fore and aft chambers; a motor in said fore section, a bearing extending across said aft section, said bearing having openings for communication of its bore with said aft chamber, said aft chamber having an opening at its stern for passage therethrough of said bearing, a propeller shaft journalled in said bearing, mercury in said aft section, and a riser tube communicating with said aft section and extending upwardly.

2. A submersible propeller and motor unit for boats comprising a housing, a plate dividing said housing to form fore and aft chambers; a motor in said fore section, a bearing extending across said aft section, said bearing having openings for communication of its bore with said aft chamber, a propeller shaft journalled in said bearing, the bearing surfaces of said shaft and bearing being capable of forming an amalgam with mercury, mercury in said aft section submerging said bearing and forming an amalgam seal between said shaft and bearing.

3. A submersible propeller and motor unit for boats comprising a housing, a plate dividing said housing to form fore and aft chambers; a motor in said fore section, a bearing extending across said aft section, a propeller shaft journalled in said bearing, the bearing surfaces in said shaft and bearing being capable of forming an amalgam with mercury, mercury in said aft section forming an amalgam seal between said shaft and bearing, and a riser tube communicating with said aft section and extending upwardly.

In witness that I claim the foregoing I have hereunto subscribed my name this 31st day of December, 1930.

CONRAD ROBERT BUCHET.